March 31, 1959     M. F. PAUL     2,879,592

NUT SPLITTER

Filed July 18, 1958

INVENTOR

MAHRLE F. PAUL

BY Beaman & Beaman
ATTORNEY

2,879,592
NUT SPLITTER

Mahrle F. Paul, Jackson, Mich.

Application July 18, 1958, Serial No. 749,452

4 Claims. (Cl. 30—272)

The invention relates to a device for removing nuts from a threaded bolt or stud and particularly pertains to a nut removal device capable of fracturing the nut.

Occasions arise wherein it is desired to remove a nut from a bolt or stud which is severely corroded or otherwise damaged such that application of the necessary torque required to rotate the nut often breaks the stud or the wrench slips on the nut misforming the same. Under these circumstances the stud or bolt must either be sawed into or broken off or the nut chiseled into small pieces for removal. The above described nut removal problem arises regularly in the automotive service field when replacing shock absorbers wherein the absorber is affixed to the automobile frame by a threaded stud extending through the frame and affixed thereto by a nut. A shock absorber is subjected to water, mud and salt thrown by the tires which quickly corrodes the stud and nut preventing removal of the nut by a wrench when replacing the absorber. As the clearances and quarters under an automobile are very restricted the use of a hack saw or hammer and chisel to break the stud or nut is extremely difficult and it is an object of the invention to provide a nut fracturing device of concise dimensions and which may be easily operated under cramped conditions.

Another object of the invention is to provide a nut fracturing device which may be operated with conventional tools and which is capable of exerting high fracturing pressures without excessive friction or damage to the device.

Yet another object of the invention is to provide a nut fracturing device which is self cleaning and which may be economically produced with standard tooling.

Figure 1:
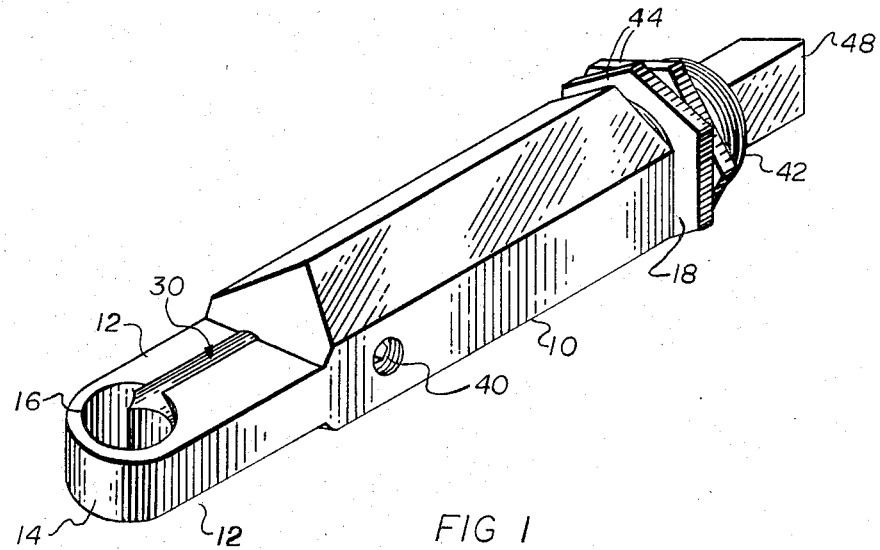
Figure 2:
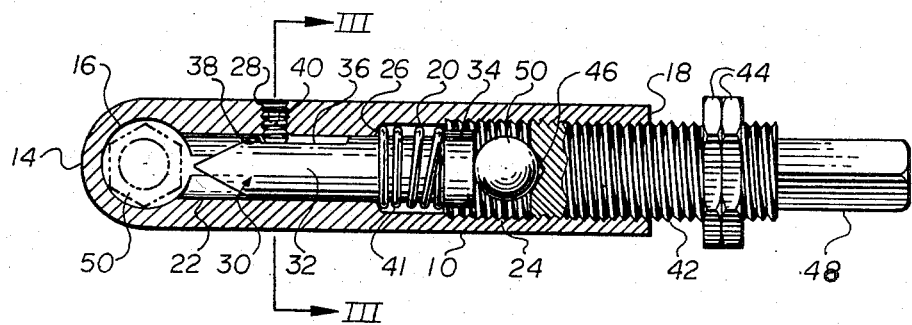
Figure 3:
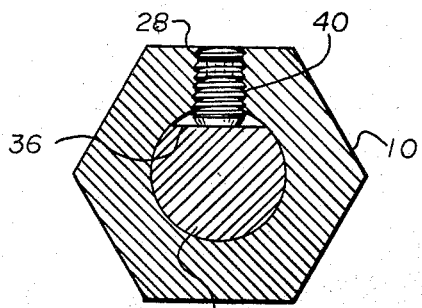

These and other objects of the invention will become more apparent when viewed with regard to the following description and accompanying drawings wherein:

Fig. 1 is a perspective view of a nut splitter embodying the concepts of the invention, Fig. 2 is a cross sectional elevational view of the nut splitter of Fig. 1, and Fig. 3 is a sectional elevational view taken along the line III—III of Fig. 2.

The nut fracturing or splitting device of the invention consists of a body 10, which in the illustrated embodiment is formed from hexagonal bar stock, having opposed machined parallel flats 12 formed adjacent to one end thereof to produce a reduced section 14 of planar configuration. A circular transverse opening 16 is centrally located in the section 14 and extends therethrough to receive the nut to be fractured as will be later apparent.

The body 10 is formed with an axial bore extending from the end 18 of the body to the opening 16. The bore is of two diameters consisting of an enlarged portion 20 and a coaxial reduced diameter portion 22 which communicates with the opening 16. The bore 20 is threaded at 24 through most of its length and a shoulder 26 is defined at the junction of the bores. A small threaded bore 28 is also formed in the body 10 transverse to the bore 22 and intersecting the same for receiving a set screw as will be later described.

A chisel or cutting member 30 is supported within body 10 in axial reciprocal relation thereto and includes a cylindrical shank portion 32 provided with a sharp cutting edge at one end and an enlarged head 34 at the opposite end thereof. The shank is preferably cylindrical and is slightly less in diameter than bore 22 to provide a close but sliding fit. An axial extending flat 36 is ground on the shank 32 forming a shoulder 38 and the bore 28, flat 36 and the chisel cutting edge are arranged such that a set screw 40, within bore 28, engaging flat 36 positions the cutting edge parallel to the axis of the opening 16.

A compression spring 41 encompasses a portion of shank 32 and is interposed between the head 34 and shoulder 26 to constantly bias the chisel to the right, as viewed in Fig. 2, to withdraw the chisel from the fracture.

The cutting force of the chisel 30 is produced by a screw 42 cooperating with the threads 24. The screw 42 is of sufficient length to extend an adequate distance into the bore 20 yet provide room for a pair of lock nuts 44 on the exterior portions of the screw. A coaxial conical recess 46 is formed on the inner end of the screw and the outer end is provided with a wrench engaging portion 48 to facilitate rotation of the screw. A spherical ball thrust bearing member 50 is interposed between the screw 42 and the head 34 and will be centered within the bore 20 by the recess 46.

When it is desired to use the tool to remove a nut 52 from a stud or bolt, the opening 16 is slipped over the stud or bolt such that the nut will be located within the opening 16 and in line with the cutting edge of the chisel 30. A wrench is applied to the portion 48 and the body 10 is grasped by the operator's hand. The screw 42 is then rotated to move the screw into the body which will likewise translate the thrust bearing 50 and chisel 30 toward the nut. Continued rotation of the screw 42 compresses spring 41 further and forces the cutting edge of the chisel into the nut and will eventually fracture the same.

After the nut has been cut once it is usually necessary to make another cut opposed 180° from the first fracture. Thus as the screw 42 is backed off the spring 41 withdraws the cutting edge from the fracture and the tool may be relocated for another cut.

In instances where care is to be taken against damaging the stud or bolt, the lock nuts 44 may be positioned on the screw for abutment with the body end 18 to stop chisel movement short of the stud. The chisel 30 is preferably formed from a hardened steel to increase the wear of the life of the cutting edge and the thrust bearing bolt 50 is also hardened. Due to the increased contact area of the ball 50 and recess 46 and the softer character of the screw in relation to the contact area of the ball with the hardened chisel head 34 the ball 50 will rotate with the screw and the relative rotation takes place at the point contact of head 34 and ball 50 minimizing friction.

It will be understood that the set screw 40 lightly bears on the flat 36 such that the chisel is prevented from rotating but the sliding movement within the body is not impaired. Should the screw 42 be backed off excessively, engagement of the shoulder 38 with the set screw 40 maintains the position of the chisel preventing accidental disassembly of the body and chisel.

Thus the nut splitter of the invention provides a tool which is highly portable and concise and may be operated in limited areas. The tool is easily disassembled for resharpening and the simplicity of the parts permits economical manufacture.

Various modifications to the described embodiment may be apparent to those skilled in the art without departing from the spirit and scope of the invention, such as the body 10 may be of cylindrical stock with a knurled surface, and it is intended that the invention be defined only by the following claims.

I claim:

1. A nut fracturing tool comprising in combination an elongated body, opposed parallel flats formed on one end of said body defining a longitudinal extending planar portion, a nut receiving opening defined in said planar portion having an axis perpendicular to said flats and intersecting the axis of said body, an axial bore defined in said body communicating with said opening, said bore including an enlarged threaded portion and a coaxial reduced portion defining an annular shoulder at the junction thereof, a chisel member having a cutting edge slidably supported within said reduced bore portion, an enlarged head formed on said chisel within said enlarged bore portion, a threaded screw member having inner and outer ends engaging the threads of said enlarged bore portion, an axial recess defined on the inner end of said screw and a wrench engageable portion formed on the outer end thereof, an anti-friction thrust bearing member interposed between said screw and the chisel head positioned within said recess, a compression spring interposed between said chisel head and said shoulder biasing said chisel toward said screw and key means within said body engaging said chisel preventing relative rotation therebetween.

2. In a nut fracturing tool as in claim 1 wherein said anti-friction thrust bearing member consists of a single spherical ball engaging at point contact a planar surface formed on said head perpendicular to the axis of said chisel.

3. In a nut fracturing tool as in claim 2 wherein said key means is comprised of a set screw positionable within said body slidably engaging an axially extending planar surface formed on said chisel member.

4. In a nut fracturing tool as in claim 3 wherein lock nut means are positionably mounted on said threaded screw member and are engageable with said body.

References Cited in the file of this patent

UNITED STATES PATENTS

| | | |
|---|---|---|
| 1,102,162 | Norman | June 30, 1914 |
| 1,706,460 | Norling | Mar. 26, 1929 |
| 2,558,641 | Beezley | June 26, 1951 |
| 2,688,185 | Brazil et al. | Sept. 7, 1954 |